2,914,378
Patented Nov. 24, 1959

2,914,378

ELUTION OF URANIUM VALUES FROM ION EXCHANGE RESINS

Richard H. Kennedy, Transvaal, Union of South Africa, assignor, by mesne assignments, to the United States of America as represented by the United States Atomic Energy Commission No Drawing. Application September 23, 1953
Serial No. 382,508

1 Claim. (Cl. 23—14.5)

This invention relates to an improved process of eluting uranium from ion exchange resins having absorbed ion.

A standard procedure for recovering uranium from low grade uranium ores is to leach the ore with sulfuric acid and contact the leach liquor with or without removal from the ore pulp with a strong base anion exchange resin. The resin adsorbs a complex uranium anion and after it has adsorbed sufficient uranium, the uranium is then eluted off with a strongly acid eluting solution. When it was attempted to elute with sulfuric acid the concentration of the eluting solution was so high in order to obtain satisfactory uranium recovery that the process was impractical. It was found that if an eluant containing nitric or hydrochloric acid as its acid constituent was used, acid concentrations as little as one-tenth or less of that required with sulfuric acid eluting solutions could be employed. The use of eluting solutions with nitric or hydrochloric acid therefore became standard. As the eluting solution has to be regenerated after precipitation of the uranium therefrom, which is usually effected with various alkalis such as ammonia, sodium hydroxide and the like, there is formed a corresponding salt of the acid and when a number of cycles of elution are carried out there is a substantial quantity of the salt present in the eluting solution, in other words, with a hydrochloric acid eluting solution sodium chloride. If the neutralization was with ammonia the salt is ammonium nitrate. In general, the eluting solutions using hydrochloric or nitric acid as their acid constituents should be quite strongly acid with pH's in order of magnitude of 1 to 2—the exact pH not being particularly critical. The hydrochloric and nitric acid eluting processes give technically excellent results. However, both acids are relatively costly as compared to sulfuric acid at least in most parts of the world. As the acid cost constitutes a considerable factor in the overall cost of the uranium recovery process this constitutes a distinct economic disadvantage in spite of the excellent technical performance of the reactions.

According to the present invention I have found that it is only necessary to have the desired anion such as chloride or nitrate present in sufficient concentration, for example approximating half normal in order to elute the uranium with speed and completeness. The nature of the acid used in order to produce the low pH is more or less immaterial so long as the acid anion does not have a deleterious chemical effect on either the resin or the process. In other words, sulfuric acid is just as effective as hydrochloric or nitric acid. Looking at the eluting solutions of the present invention in a different way they may be considered as strongly acid mixtures of sulfuric acid and sodium chloride or ammonium chloride in the case of chloride ion elutions or the corresponding nitrates in the case of nitrate ion elutions. Of course in the solution the ions are present in their particular equilibrium form but as a practical matter when the solution is being first formed or a solution from the precipitation of uranium regenerated the operation involves the addition of sulfuric acid and a chloride or nitrate in sufficient amounts to make up for the loss of chloride or nitrate ion in the process. This permits an extremely cheap operation for in most parts of the world the cheapest form of chloride ion is sodium chloride which is ordinarily much cheaper than hydrochloric acid and of course sulfuric acid is much cheaper than the other two acids which were hitherto used.

It is not known with certainty why such enormously greater amounts of sulfuric acid have to be used if the acid is used alone in the absence of the small amounts of chloride and nitrate ion as in the present process and it is not desired to limit the invention to any definitely proved theory. However, I believe that one reason may be that the sulfate ion alone in the eluting solution does not tend to break up the complex uranium ion on the resin or does so only incompletely and that the chloride and nitrate ions are more effective in performing this result. This would explain why much smaller amounts of acid work in the presence of the chloride and nitrate ion even though the acid is sulfuric acid but it is possible that other factors play a part.

The process of the present invention operates smoothly and easily and gives substantially the same uranium recoveries with comparable amounts of eluting solution as can be obtained when hydrochloric or nitric acid are used as the only acids. No difficulty was encountered in buildup of sulfate ions in the eluting solution and approximately the same number of cycles of re-use of the eluting solution are possible. In other words, the present invention has all of the technical advantages of smooth operation, good efficiency and short time cycle and at the same time permits a very marked saving in cost by using cheap sulfuric acid and in the case of the chloride ion variation, cheap sodium chloride. No compromise is involved as the same operating efficiencies are obtained with the cheaper materials cost.

The nature of the inorganic cation present in the eluting solution does not appear to influence the process materially. Of course a cation such as calcium which forms an insoluble sulfate will reduce the purity of uranium precipitate obtained and for this reason is less desirable. However, the common cations such as sodium, potassium, ammonium, magnesium and the like can all be used in the present process with equal effectiveness regardless of whether they are used to introduce chloride or nitrate ion. The choice is largely dictated by economic factors or by factors depending on the nature of the other steps in the process such as the precipitation step. In general, where nitric acid is obtained from synthetic ammonia, ammonium nitrate will usually be the cheapest salt. On the other hand, when the chloride ion is to be employed, ordinarily sodium chloride is the cheapest source. These two modifications therefore may be considered as economically preferable.

The invention will be described in greater detail in conjunction with the specific example in which the parts are by weight.

*Example.*—A uranium ore from the Belgian Congo was leached with sulfuric acid to produce a leach liquor which was then passed through columns containing a strong base anion exchange resin. The resin was of a polystyrene divinyl benzene base treated with chloromethyl ether and activated with tri-methylamine to produce quaternary groups. On completion of the adsorption, the resin carried from 66 to 69 milligrams $U_3O_8$ per cc. of resin. Different portions of the resin were then eluted to a 97 percent recovery of the uranium in the eluate. In the one case the eluting solution was 1 M sodium chloride with sufficient sulfuric acid to bring the pH of the eluting solution to approximately one. The number of ccs. of eluant required for 97 percent recovery was 19 per cc. of resin and elution time 230 minutes. A second portion of the resin was eluted with a solution of 0.9 M sodium chloride and 0.1 M hydrochloric acid. To obtain the same recovery of uranium 15.3 cc. of eluent per cc. of resin was required and the elution time was 190 minutes.

The comparative tests were repeated with a strong base anion exchange resin of similar constitution sold by the Permutit Co. under their designation SE. This resin adsorbed a somewhat larger amount of uranium. In one portion 88 milligrams of $U_3O_8$ per cc. of resin was adsorbed.

Elution with the sodium chloride, sulfuric acid eluting solution described above required 9.3 cc. eluant per cc. of resin with an elution time of 120 minutes. Another portion of the resin containing substantially the same amount of uranium was eluted with the ammonium chloride, hydrochloric acid eluting solution described above and required 8.3 cc. of eluting solution per cc. of resin and an elution time of 102 minutes.

It will be noted that the recoveries are the same for the sulfuric acid, sodium chloride solution as for the ammonium chloride, hydrochloric acid solution. The former required slightly longer time and a little more eluting solution. As a major cost in the eluting step is represented by the chemicals consumed, a slight drop in output for a given plant represents a negligible cost increase as compared to the very large saving represented by the use of sulfuric acid instead of hydrochloric acid.

When a nitrate is used in place of the sodium chloride in the sulfuric acid eluting solution the results are substantially the same and the same savings in acid cost are realized.

In the above example the concentration of the chloride or nitrate ion in the eluting solution was one molar. This concentration is in no sense critical and may vary over a wide range. When too dilute eluting solutions are used, time is increased disproportionately and dilute solutions represent a more serious recovery problem for the uranium that they contain. Stronger eluting solutions may be used but with chloride if the concentration gets too high, for example, five molar the elution efficiency drops and may even reverse itself. The practical range for optimum commercial results lies between about ⅔ molar and 1½ molar in the case of chloride. In the case of nitrate the lower limit for satisfactory uranium concentrations in the eluting solution and reasonable eluting time is the same as for the case where the chloride ion is introduced. In the case of the nitrate ion the reversing result with higher concentrations does not take place. However it is economically undesirable to go materially beyond 1.5 molar because the added cost for nitrate mechanically lost in the operations is not offset by any sufficient increase in capacity of the equipment.

I claim:

A method of eluting uranium from an ion exchange resin having adsorbed complex uranium ion which comprises subjecting the resin to an eluting solution which contains a sufficient amount of sulfuric acid to produce a pH of not more than about 2 and enough of a compound setting free a nitrate ion so that the nitrate ion concentration in the eluting solution is from ½ to 1½ molar, the elution being carried out until the desired amount of the uranium is removed from the resin.

References Cited in the file of this patent

UNITED STATES PATENTS 1,471,514    Elliott _____ Oct. 23, 1923

FOREIGN PATENTS 626,882    Great Britain _____ July 22, 1949